(12) United States Patent
Kutner

(10) Patent No.: US 11,089,036 B2
(45) Date of Patent: Aug. 10, 2021

(54) IDENTIFYING SECURITY RISKS AND FRAUD ATTACKS USING AUTHENTICATION FROM A NETWORK OF WEBSITES

(71) Applicant: SAP SE, Walldorf (DE)

(72) Inventor: Eran Kutner, Tel Aviv (IL)

(73) Assignee: SAP SE, Walldorf (DE)

( * ) Notice: Subject to any disclaimer, the term of this patent is extended or adjusted under 35 U.S.C. 154(b) by 237 days.

(21) Appl. No.: 16/233,464

(22) Filed: Dec. 27, 2018

(65) Prior Publication Data
US 2020/0213334 A1 Jul. 2, 2020

(51) Int. Cl.
*H04L 29/06* (2006.01)

(52) U.S. Cl.
CPC ...... *H04L 63/1416* (2013.01); *H04L 63/0263* (2013.01); *H04L 63/083* (2013.01); *H04L 63/101* (2013.01); *H04L 63/1466* (2013.01)

(58) Field of Classification Search
CPC ............. H04L 63/0227; H04L 63/0245; H04L 63/0263; H04L 63/08; H04L 63/083; H04L 63/10; H04L 63/101; H04L 63/14; H04L 63/1408; H04L 63/1416; H04L 63/1466
See application file for complete search history.

(56) References Cited

U.S. PATENT DOCUMENTS

| | | | | |
|---|---|---|---|---|
| 8,613,064 B1* | 12/2013 | Roy | ...................... | G06F 21/316 726/7 |
| 8,769,607 B1* | 7/2014 | Jerdonek | ................. | G06F 21/46 726/1 |
| 8,904,506 B1* | 12/2014 | Canavor | ................. | G06F 16/00 726/7 |
| 9,298,890 B2* | 3/2016 | Bajenov | .................... | G06F 21/00 |
| 10,129,298 B2* | 11/2018 | Grady | ...................... | G06F 21/45 |
| 10,574,697 B1* | 2/2020 | McClintock | ........ | H04L 63/1491 |
| 10,931,691 B1* | 2/2021 | Kapelevich | ............ | G06N 7/005 |
| 2011/0126273 A1* | 5/2011 | Bhatia | ................... | H04L 9/3215 726/7 |
| 2011/0167494 A1* | 7/2011 | Bowen | ................ | H04L 63/1491 726/24 |
| 2012/0084866 A1* | 4/2012 | Stolfo | ................. | H04L 63/1416 726/25 |
| 2015/0326556 A1* | 11/2015 | Vadura | ................ | H04L 63/0815 726/4 |
| 2017/0346797 A1* | 11/2017 | Yedidi | ..................... | H04L 63/14 |
| 2018/0007087 A1* | 1/2018 | Grady | ................... | H04L 63/101 |

(Continued)

*Primary Examiner* — Khang Do
(74) *Attorney, Agent, or Firm* — Fish & Richardson P.C.

(57) ABSTRACT

The present disclosure relates to computer-implemented methods, software, and systems for identifying potential attacks through monitoring of user credential login attempts across a network of websites. One example method includes monitoring login attempts associated with a plurality of websites and identifying a first login attempt at a first website associated with a set of user credentials. In response to determining that the set of user credentials do not correspond to a valid set of credentials, a count value associated with an entry in a failed credential log associated with the user credentials is incremented. If the count threshold associated with a compromised user credential rule is exceeded by the current count value, then the first set of credentials is identified as a set of compromised credentials and at least one protective action is initiated.

18 Claims, 3 Drawing Sheets

(56) References Cited

U.S. PATENT DOCUMENTS

| | | | |
|---|---|---|---|
| 2018/0046796 A1* | 2/2018 | Wright | G06F 21/45 |
| 2018/0124082 A1* | 5/2018 | Siadati | G06N 5/047 |
| 2019/0007387 A1* | 1/2019 | Jin | H04L 9/3226 |
| 2019/0007428 A1* | 1/2019 | Moen | H04L 67/02 |
| 2019/0007449 A1* | 1/2019 | Le Merrer | H04L 63/1458 |
| 2020/0137109 A1* | 4/2020 | Endler | H04L 63/1466 |
| 2020/0153836 A1* | 5/2020 | Johnson | H04L 63/1491 |
| 2021/0099451 A1* | 4/2021 | Will | H04L 63/101 |

* cited by examiner

IDENTIFYING SECURITY RISKS AND FRAUD ATTACKS USING AUTHENTICATION FROM A NETWORK OF WEBSITES

TECHNICAL FIELD

The present disclosure relates to computer-implemented methods, software, and systems for identifying potential attacks through monitoring of user credential login attempts across a network of websites.

BACKGROUND

Cyber attacks are malicious and deliberate attempts by individuals or organizations to breach information systems and user accounts of another individual or organization. Such attacks may be an attempt to gain personally identifiable information that may allow financial or privacy-related intrusions upon various persons and entities. Cyber attacks may include, but are not limited to, denial-of-service (DoS) and distributed DoS (DDoS) attacks, man-in-the-middle (MitM) attacks, credential stuffing, and other types of attacks.

Credential stuffing is a type of cyber attack where a hacker obtains a list of usernames and passwords by hacking into or obtaining information from one website or system and then attempting to use those obtained credentials to log into or access data from one or more other websites or systems. As users may tend to use the same password across multiple websites, this attack may be significantly successful where valid credentials are obtained.

SUMMARY

The present disclosure involves systems, software, and computer implemented methods for identifying potential attacks through monitoring of user credential login attempts across a network of websites. One example method may include operations such as monitoring, at a centralized authentication system, login attempts associated with a plurality of websites. A first login attempt at a first website from the plurality of websites is identified, wherein the first login attempt is associated with a first set of user credentials. In response to determining that the first set of user credentials do not correspond to a valid set of user credentials for the first website, incrementing a count value associated with an entry in a failed credential log managed by the centralized authentication system associated with the first set of user credentials is incremented. A determination is made as to whether a count threshold associated with a compromised user credential rule is exceeded by the current count value associated with the entry in the failed credential log. In response to determining that the count threshold is exceeded, the first set of credentials is identified as a set of compromised credentials, and at least one protective action associated with the first set of credentials is automatically initiated . . . .

Implementations can optionally include one or more of the following features. In some instances, the first set of user credentials identifies an account or user name associated with the first web site, and determining that the first set of user credentials do not correspond to a valid set of user credentials for the first website comprises determining that the account or user name identified in the first set of user credentials does not exist at the first website.

In some instances, the method may further comprise identifying a second login attempt at a second website from the plurality of websites, wherein the second login attempt is associated with the first set of user credentials. In response to determining that the first set of user credentials do not correspond to a valid set of user credentials for the second website, incrementing the count value associated with the entry in the failed credential log managed by the centralized authentication system associated with the first set of user credentials. A determination is made as to whether the count threshold associated with the compromised user credential rule is exceeded by the current count value associated with the entry in the failed credential log, and, in response to determining that the count threshold is exceeded, the first set of credentials is identified as a set of compromised credentials and automatically initiating at least one protective action associated with the first set of credentials.

In some instances, prior to determining that the first set of user credentials do not correspond to a valid set of user credentials for the first website, the method may further include accessing a list of known compromised sets of user credentials, comparing the first set of user credentials to the list of known comprised sets of user credentials to identify a match, and, in response to detecting a match in the list of known comprised sets of user credentials, rejecting the first login attempt.

In some instances, incrementing the count value associated with the entry in the failed credential log managed by the centralized authentication system associated with the first set of user credentials can comprise determining whether an entry associated with the first set of user credentials exists in the failed credential log after determining that the first set of user credentials do not correspond to a valid set of user credentials for the first website. In response to determining that an entry associated with the first set of user credentials does not exist in the failed credential log, an entry corresponding to the first set of user credentials in the failed credential log is instantiated and a corresponding count value of the entry is set to one.

In some instances, automatically initiating at least one protective action associated with the first set of credentials comprises adding the first set of user credentials to a list of known compromised sets of user credentials.

In some instances, automatically initiating at least one protective action associated with the first set of credentials comprises identifying a communication channel associated with a user corresponding to the first set of credentials, and transmitting a notification of the compromised user credential to the user via the identified communication channel.

In some instances, the count threshold comprises a predetermined number of failed attempts associated with the first set of user credentials.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
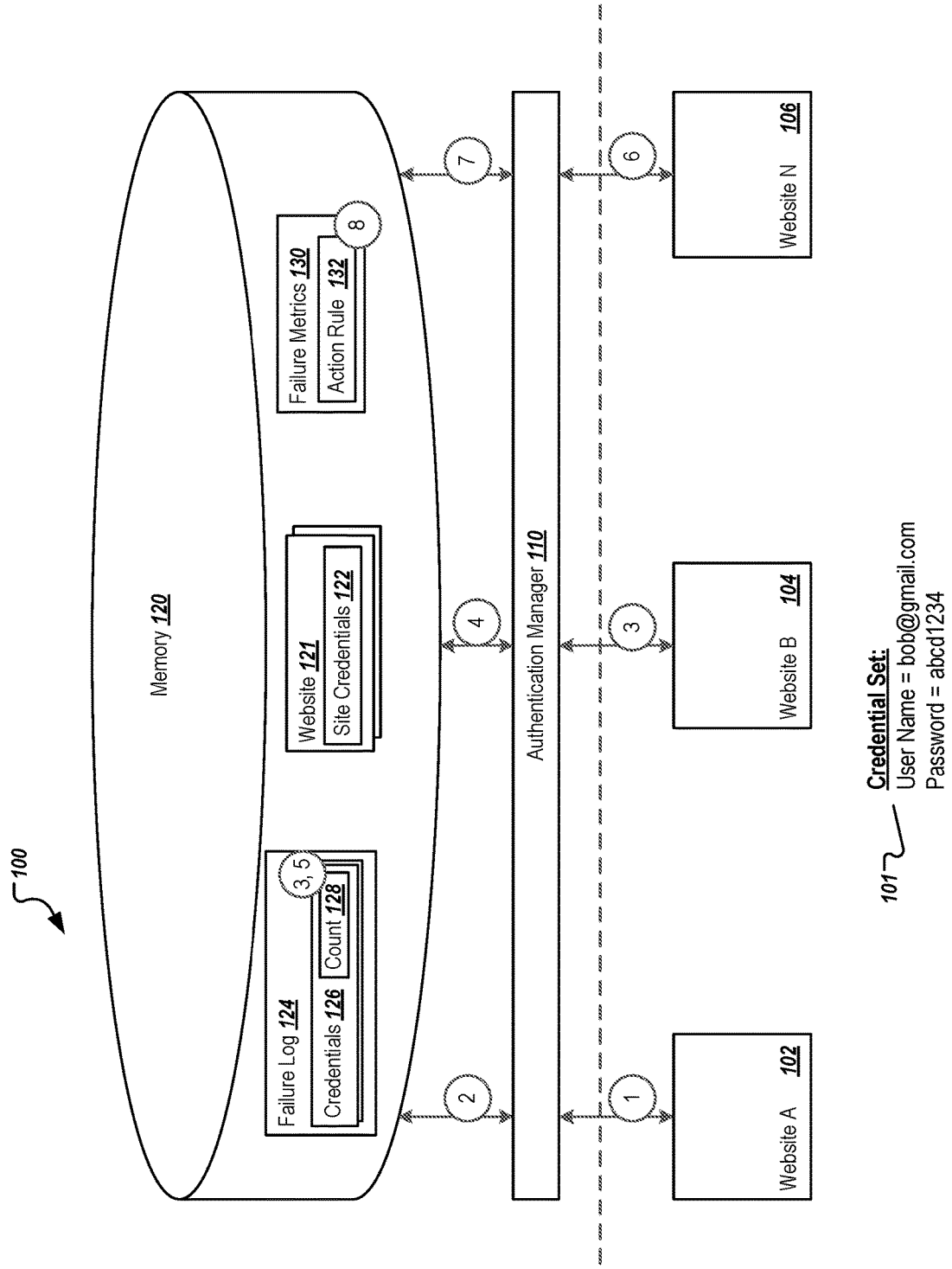
FIG. 1 illustrates an example of attempts to use a particular compromised credential set being used across a plurality of networked websites.

The present disclosure describes various tools and techniques for identifying potential attacks through monitoring of user credential login attempts across a network of websites. Once a potential attack is identified, the solution can further perform actions to minimize the damage of such attacks, including stopping further attempts from being successful, even where the credentials being used are otherwise correct and valid.

Because attackers do not know which other websites or systems that users associated with any ill-gotten credentials are associated or registered, the attackers may perform attempts to login at different sites or systems using those particular credentials until successful logins are found. In many instances, a single failed attempted login would raise no flag. Traditional credential protection mechanisms are designed to defend against brute force attacks targeting a single account, when many different passwords are being tried in hopes of finding a single successful one. Those solutions cannot handle cases where only a single attempt is made to check if credentials obtained somewhere else will also work on a particular target site. In some instances, if a breach is known, the corresponding credentials may be pre-identified as potentially corrupted or compromised, and may be black-listed in a corresponding database, possibly requiring real users to input secondary authentication (e.g., secret questions, two-factor authentication, re-registration, etc.) to allow logins. However, in many instances, the fact that particular credentials have been compromised is not known. Because the captured credentials may only be used once in a stuffing attempt, current systems and existing solutions are ill-equipped to challenge the reuse of unknowingly compromised credentials. As these unknowingly compromised set of credentials may be used at multiple websites and systems and can be tried without raising alarms, attackers may have essentially unlimited attempts at using the captured information in different locations. Similarly, small modifications to credentials may be tried (e.g., incrementing or decrementing a number value at the end of a password) and would not raise an issue in current systems. While many sites or systems may not use the same credentials, one successful attempt may cause significant issues to the unfortunate user and their sensitive and/or personal information.

The present solution described herein attempts to leverage a shared collection of login information among a plurality of sites. In many instances, customer identity and access management platforms may be provided to perform identity management and access to particular sites. In those instances, customer information may be stored at a cloud-based or otherwise remote system, where inputted customer credentials are submitted to the platform to determine whether they match stored credentials for a particular site or system. In other instances, the solution may be successful where two or more sites agree to share some metadata about login attempts they see, which can include hashed versions of the username and password and an indication if the attempt was successful or failed, and if the account associated with the attempted sign in exists or does not exist on that website. Using this shared backend system and its association with a network of websites, or alternatively the shared metadata, information about failed and successful login attempts may be shared to identify potential credential stuffing attacks. In general, stuffing attacks are characterized by a high ratio of login failures, specifically for login attempts where corresponding accounts or user names associated with an account do not exist on a particular target site. Further, such attacks may only be attempted once on a target site before the attackers move on to a next target site. Using information about failed login attempts, particularly where the failed login attempt is associated with an account that has not been registered at the target website, analyses can be performed to identify ongoing credential stuffing attacks and take appropriate security measures to block said attacks. In some instances, certain failure or attempt thresholds may be monitored to determine if such thresholds are exceeded, such as whether a predefined or dynamically determined number of attempts using a same or similar credential set over multiple sites within a certain period of time have been attempted and have failed, then related accounts can be locked, notifications can be generated, and additional information can be obtained, all in order to stop the attack from continuing further.

In many instances, the present solution can not only detect ongoing credential stuffing attacks, but may also identify previously unknown data leaks. Today's data leaks may become known when attackers publish the stolen data, usually after nefarious acts have been committed, or may be discovered by the victims after notifications of failed logins. Many available solutions use the published stolen information to take action and invite users to change passwords and credential sets that are similar to those previously captured. However, these post facto discoveries usually occur well after damage has been done. The present solution, in contrast, does not need a published list of compromised credentials to be available in order to identify a threat. Instead, only the attacker's activity is used to detect the data leak. In particular, if a new set of attacks around a plurality of different credential sets is identified, the commonality of those credential sets may be analyzed and matched to credential sets owned or used by existing websites, applications, and/or databases to determine the origin of the data leak.

In some instances, credential sets used in failed attempts may also be compared to other failed credential sets to determine whether an attacker is attempting slight modifications to particular user names or passwords. If a significant similarity is identified using a similarity analysis (e.g., on the exact values entered, or based on hashed versions of the values submitted), the same credentials may be considered attempted.

In some instances, once a particular credential set is identified as likely compromised, that credential set can be added to one or more of the existing solution's blacklists. Certain protective actions may include, but are not limited to, blocking a current (and any future) login attempts using the credential set, notifying a user associated with the credentials about the potentially compromised credentials (e.g., via a known or available channel associated with the user name or credential set, including a channel not associated with the compromised credentials such as an alternative email address), require a password change on the next login, two-factor authentication, secret questions, phone verification, and/or provide information to the user about other locations where a similar or identical credential set is used (e.g., based on knowledge of other accounts associated with the credentials or user). Some or all of these actions may be taken, as well as other appropriate interactions.

FIG. 1 illustrates an example of attempts to use a particular compromised credential set being used across a plurality of networked websites. As illustrated, the compromised credential set 101 is a user name of "bob@gmail.com" with a password of "abcd1234". The credential set 101 may be obtained through any data leak, including a mass data breach at a retailer's eCommerce system, a leak or illegally obtained set of data, or from any other suitable event or source. While existing systems require a predefined set of compromised credentials, the new solution described herein is able to learn through attacker activities across a plurality of websites. Initially, website A 102 receives the credential set 101 and submits them. Website A 102 has delegated its authentication procedures to authentication manager 110, which can be a registration as a service (RaaS)-based system or similar component where credentials are stored, and shares the received credentials as shown by (1). It is noted that, alternatively, website A 102 may simply share failed credentials with a third-party authentication manager 110 to allow for the networked solution to work without outsourcing the entirety of its authentication processes.

The authentication manager 110 can access, as shown by (2), memory 120, which may store or reference sets of credential-related information. Memory 120 can be specifically associated with the authentication manager 110, and can store sets of site credentials 122 associated with multiple websites 121, including website A 102. The authentication manager 110 can perform an analysis to determine whether the provided credential set 101 matches any credentials in the set of site credentials 122 for the corresponding website 121. If so, authentication is granted and the site may be accessed. In the present case, however, the credential set 101 does not correspond to the site credentials 122 of website 121 corresponding to website A 102.

As illustrated, memory 120 includes failure log 124, which can store information related to particular credentials 126 that have been used across the networked or related set of websites, but which do not correspond to existing site credentials 122. In this case, the credential set 101 can be added for the first time to the failure log 124, and can be associated with a count 128 of an initial value of 1, as shown by (3). In connection with the failed attempt, access to website A 102 can be denied by the authentication manager 110.

Before moving to a second attempt at website B 104, it is noted that memory 120 stores a set of failure metrics 130. The set of failure metrics 130 can be used to determine when it is determined, based on a current status of the failure log 124, that a particular set of credentials 126 should be determined to be compromised or associated with a credential stuffing attack. The failure metrics 130 can be a predetermined statistical setting or threshold that determines when a comprised determination is made. For example, if 5 failed attempts are made across different sites, a failure metric 130 or threshold may be met and the credential 126 may be deemed compromised. In some instances, the metrics 130 or associated threshold may be dynamically determined at runtime or during a series of attempts. For instance, if a particular number of failed attempts are received within a certain time period (e.g., by a high-speed bot or other automated login attempt within a minute), a different, and possibly lower than the predetermined threshold, number of attempts may satisfy or exceed the threshold. Any suitable metric 130 may be used or applied, and may be modified by particular site owners, the manager of the authentication manager 110, or particular users in some cases.

The failure metrics 130 may be associated with one or more action rules 132, where the action rules 132 determine the operations to be taken in response to a detection that a particular credential 126 is compromised. The action rules 132 may be used to lock one or more accounts, such as those with a similar user name as the user name associated with the compromised credential set 101. In some instances, the authentication manager 110 can identify an alternative contact associated with the account being attacked, and can send a notification to the user. If the user name is an email address, an alternative contact channel may be used in some cases. In some instances, real users may be notified during their next login to any of the websites managed by the authentication manager 110. In some instances, the authentication manager 110 may be associated with a password manager, and may automatically modify one or more passwords or credentials that match the compromised credentials 126. Any other suitable action may be associated with the action rules 132, and can be performed when appropriate.

Returning to the interaction with website B 104, a second attempt with the credential set 101 may be performed by the attacker. Website B 104 can transmit, via (3), the credential set 101 to the authentication manager 110, where the credential set 101 is evaluated against the corresponding site credentials 122 at (4). In response to a failure with website B's 104 credentials 122, a check is performed as to whether the credential set 101 has already been identified by another site as a failed set. In this case, the credential set 101 has already been added as credentials 126, and the count 128 can be incremented in response to the next failure at (5). The failure metrics 130 can be checked at this time, and a determination can be made as to whether those metrics 130 are met. At this time, they may not be.

Multiple additional attempted logins may be made, and with website N 106, another attempt is made with credential set 101. Any number of intermediate attempts may have been made between the attempt with website N 106 and the described attempt with website B 104. The credential set 101 can again be provided to the authentication manager 110, via (6), and the authentication manager 110 can check whether the credentials meet the site credentials 122 of website N 106. In response to another failure, count 128 for the corresponding credentials 126 can be incremented, and the metrics 130 can be considered. In this case, the metrics 130 or threshold may be met (e.g., after 5 failed attempts and count 128 having a value of 5). In response to the threshold being met, at least one corresponding action rule 132 can be triggered at (8), including but not limited to notifying a user associated with the user name that a potential attack associated with their credentials is occurring.

While not illustrated, the described solution can be used to supplement existing solutions relying on predefined black lists of compromised credentials. In this case, once the likely compromised credential is identified, such credentials can be added to the same blacklists and can be used by the authentication manager 110 and any other related systems to ensure that the credential set 101 is not used again at any other connected or network sites.

Figure 2:
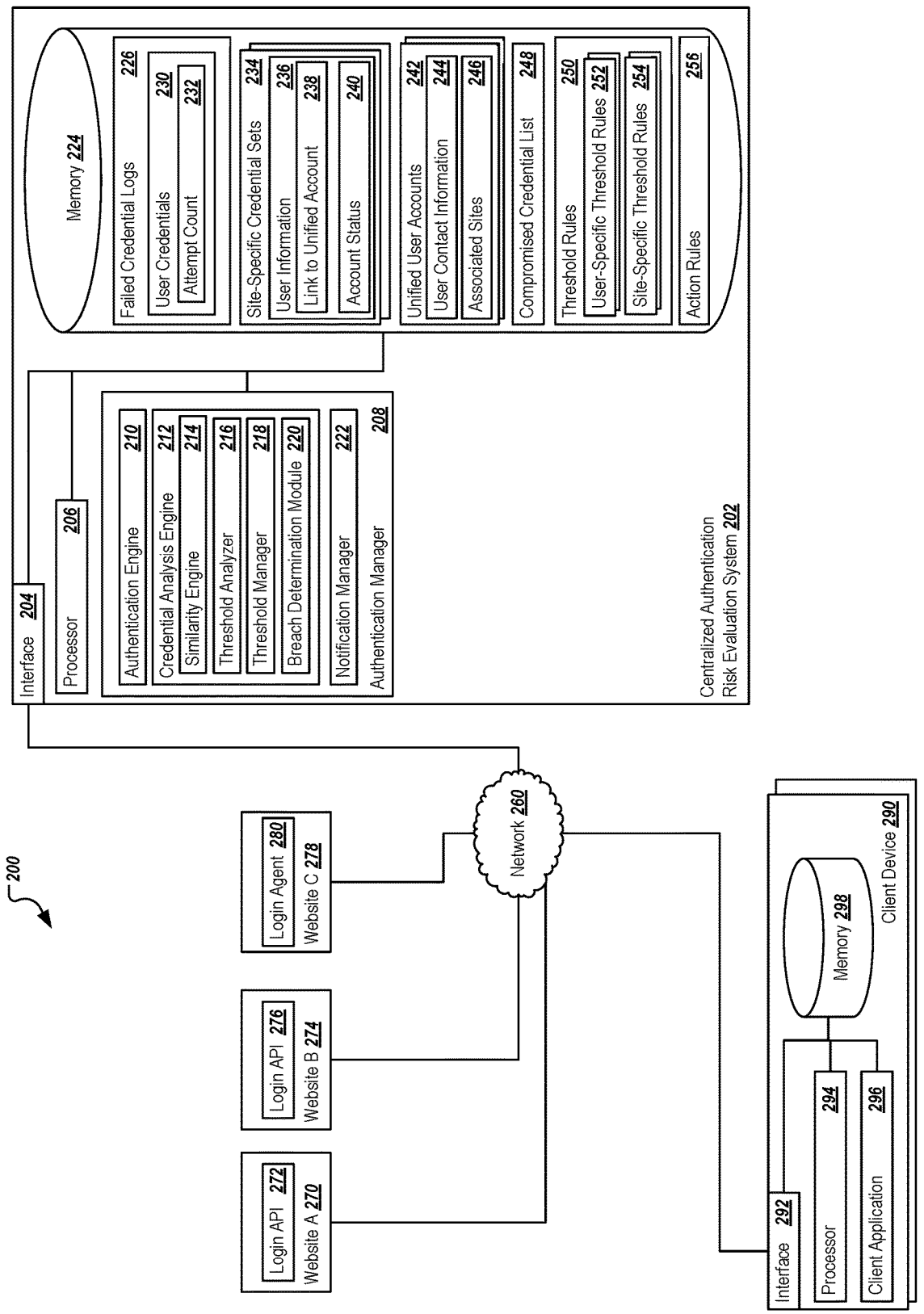
FIG. 2 is a block diagram illustrating a system for identifying potential attacks through monitoring of user credential login attempts across a network of websites.

FIG. 2 is a block diagram illustrating a system 200 for identifying potential attacks through monitoring of user credential login attempts across a network of websites. System 200 includes functionality and structure associated with a networked set of websites 270, 274, and 278 managed by a centralized authentication risk evaluation system 202. The centralized authentication system 202 monitors attempts logins from the plurality of websites to assist in determining whether attacks associated with compromised user credentials are occurring in real time. The centralized authentication risk evaluation system 202 can include or provide protections available in existing solutions (e.g., a predefined compromised credential list 248), but can specifically incorporate new protections to allow for detection and determination of new compromised credentials based on an analysis of failed login attempts using similar credentials at various websites, such as those resulting during a credential stuffing attack. Further, the centralized authentication risk evaluation system 202 can allow multiple websites to benefit from the determinations in real time, as well as to notify the users and entities/organizations associated with any such compromised credentials of the potential intrusion.

As illustrated, system 200 includes or is communicably coupled with the centralized authentication risk evaluation system 202, a plurality of websites 270, 274, and 278, and at least one client device 290, each connected via network 260. System 200 is a single example of possible implementations, with alternatives, additions, and modifications possible for performing some or all of the described operations and functionality. Although shown separately, in some implementations, functionality of two or more systems, servers, or illustrated components may be provided by a single system or server. In some implementations, the functionality of two or more systems, servers, or illustrated components may be provided by a single component, system, or server. In some implementations, the functionality of one illustrated system or server may be provided by multiple systems, servers, or computing devices, including those physically or logically local or remote to each other. Any combination or permutation of systems may perform the functionality described herein.

As used in the present disclosure, the terms "computer" or "computing device" are intended to encompass any suitable processing device. For example, centralized authentication risk evaluation system 202 and client device 290 may be any computer or processing device (or combination of devices) such as, for example, a blade server, a general-purpose personal computer (PC), MAC, workstation, UNIX-based workstation, embedded system or any other suitable device. Moreover, although FIG. 2 illustrates particular components as a single element, those components may be implemented using a single system or more than those illustrated, as well as computers other than servers, including a server pool or variations that include distributed computing. In other words, the present disclosure contemplates computers other than general-purpose computers, as well as computers without conventional operating systems. For example, the centralized authentication risk evaluation system 202 may be any system which can manage authentication attempts and approvals/rejections associated with one or more websites and systems, and that can determine, based on one or more metrics or thresholds, whether a particular credential set used across multiple sites may be compromised. The centralized authentication risk evaluation system 202 may be a cloud-based system providing operations as a service for the websites, or may be a backend system managed by a particular provider, among others. The centralized authentication risk evaluation system 202 may be a server or a set of servers, a cloud-based application or system, or any other suitable system. The client device(s) 290, as will be described below, may be any suitable device, including a desktop system or workstation, a mobile device, a server, or any other device used by authorized and/or illicit users to attempt to login to one or more websites. In general, each illustrated component may be adapted to execute any suitable operating system, including Linux, UNIX, Windows, Mac OS®, Java™, Android™, Windows Phone OS, or iOS™, among others.

In general, the centralized authentication risk evaluation system 202 can be generally associated with the execution of one or more other applications associated with the authentication operations. These applications may be any suitable applications, including non-business applications. At least some of the applications may be an enterprise application or applications in some instances, and can include but are not limited to an enterprise resource planning (ERP) system, a customer relationship management (CRM) system, a supplier relationship management (SRM) system, a supply chain management (SCM) system, a product lifecycle management (PLM) system, or any other suitable system. In some instances, the centralized authentication risk evaluation system 202 can be associated with and can integrate a combination or at least some of these systems as part of an end-to-end enterprise application or portion thereof. In particular, the illustrated system 202 may be associated with an authentication manager 208 that performs, through its inherent functionality or by using specific programs, tasks, or modules, activities associated with the described solution.

The illustrated centralized authentication risk evaluation system 202 includes an interface 204, at least one processor 206, the authentication manager 208, and memory 224. Interface 204 is used for communicating with other systems in a distributed environment—including within the system 200, connected to the centralized authentication risk evaluation system 202 and/or network 260, as well as other systems or components communicably coupled to the network 260. Generally, the interface 204 includes logic encoded in software and/or hardware in a suitable combination and operation to communicate with the network 260 and other communicably coupled components. More specifically, the interface 204 may comprise software supporting one or more communication protocols associated with communications such that the centralized authentication risk evaluation system 202, network 260, and/or the interface's hardware is operable to communicate physical signals within and outside of the illustrated system 200.

Network 260 facilitates wireless or wireline communications between the components of the system 200 (e.g., between combinations of the centralized authentication risk evaluation system 202, client device(s) 290, the one or more websites 270, 274, and 278, and/or other components, among others) as well as with any other local or remote computer, such as additional mobile devices, clients, servers, remotely executed or located portions of a particular component, or other devices communicably coupled to network 260, including those not illustrated in FIG. 2. In this illustrated environment, the network 260 is depicted as a single network, but may be comprised of more than one network with departing from the scope of this disclosure, so long as at least a portion of the network 260 may facilitate communication between senders and recipients. In some instances, one or more of the illustrated components (e.g., the centralized authentication risk evaluation system 202) or portions thereof may be included within network 260 as one or more cloud-based services or operations. The network 260 may be all or a portion of an enterprise or secured network, while in another instance, at least a portion of the network 260 may represent a connection to the Internet. In some instances, a portion of the network 260 may be a virtual private network (VPN) or an Intranet. Further, all or a portion of the network 260 can comprise either a wireline or a wireless link. Example wireless links may include 802.11a/b/g/n/ac, 802.20, WiMax, LTE, and/or any other appropriate wireless link. In other words, the network 260 encompasses any internal or external network, networks, sub-network, or combination thereof operable to facilitate communications between various computing components inside and outside the illustrated system 100. The network 260 may communicate, for example, Internet Protocol (IP) packets, Frame Relay frames, Asynchronous Transfer Mode (ATM) cells, voice, video, data, and other suitable information between network addresses. The network 260 may also include one or more local area networks (LAMs), radio access networks (RANs), metropolitan area networks (MANs), wide area networks (WANs), all or a portion of the internet and/or any other communication system or systems at one or more locations.

As noted, the centralized authentication risk evaluation system 202 may be any suitable computing device, and may include one or more processors 206. Although illustrated as a single processor 206 in FIG. 2, multiple processors may be used according to particular needs, desires, or particular implementations of the system 200. Each processor 206 may be a central processing unit (CPU), an application specific integrated circuit (ASIC), a field-programmable gate array (FPGA), or another suitable component. Generally, the processor 206 executes instructions and manipulates data to perform the operations of the centralized authentication risk evaluation system 202, in particular, those related to executing the various modules or software illustrated therein (e.g., the authentication manager 208) and its related functionality. Specifically, the processor 206 executes the algorithms and operations described in the illustrated figures, as well as the various software modules and functionalities, including the functionality for sending communications to and receiving transmissions from the client device(s) 290 and plurality of websites 270, 274, 278, as well as to process and prepare responses related to one or more credential analyses and login attempts. Each processor 206 may have a single core or multiple cores, with each core available to host and execute an individual processing thread.

Regardless of the particular implementations, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, Objective-C, JavaScript, Java™ Visual Basic, assembler, Perl®, Swift, HTML5, any suitable version of 4GL, as well as others.

As described, the authentication manager 208 may be any suitable application, program, mobile app, or other component. In general, the authentication manager 208 can receive information associated with one or more login attempts received from a plurality of websites and systems, including websites A, B, and C (270, 274, and 278, respectively). The authentication manager 208 can perform operations previously performed by the websites themselves as they relate to user management and authentication operations. Information about various user accounts of each website can be stored in a set of site-specific credential sets 234, which can each be specifically associated with a particular website or system, and that traditionally was maintained locally by the corresponding website. In some implementations, the centralization authentication risk evaluation system 202 allows system administrators to outsource such operations to the remote system 202, obtaining the benefits of using the system 202 as a cloud-based resource and minimizing local needs for managing the respective website. Each of the site-specific credentials 234, as illustrated, may include sets of user information 236 identifying the users and the sets of accepted current credentials for those users. Each set of user information 236 may be specific to a particular site. In some instances, a unified account 242 may exist for users, such as when the same user has multiple accounts at different websites. In some instances, the unified account 242 may be created based on common personally-identifiable information, or may be manually linked by the user or automatically identified by the system 202, among others. The user information 236 may include a link to a particular unified account 242 of that particular user, where the unified account 242 also includes information of other sites 246 at which the unified user account 242 has specific individual accounts. The unified account 242 may also include user contact information 244, including one or more email accounts, messaging accounts, or other channels through which the user can be contacted. By providing two or more channels of communication, the corresponding user may be contacted at an account or channel that is not associated with the compromised credentials. For example, if a user name used in the credentials is a first email address, a second alternative email address can be used to contact the user. Returning to the site-specific credential set 234, specific user credentials may also be associated with an account status 240 used to determine whether a particular credential set 234 is allowable or locked, such as after one or more failed attempts at other networked websites that trigger the likely determination that an attack is ongoing.

Returning to the authentication manager 208, an authentication engine 210 can be used to determine whether a received credential set for a particular website matches particular credentials from the corresponding site-specific credential set 234. If so, then the authentication engine 210 can determine that the login is allowed, and authenticate the user through normal operations. In some instances, the authentication manager 208 may use a compromised credential list 248 initially, and can determine whether or not the received credentials are included in that list. Inclusion in the list 248 may mean that the credentials are credentials known to be compromised, possibly due to a known data breach or due to the present solution previously identifying those credentials as compromised. In either case, in those instances of a match to the compromised credential list 248, the login attempt may not be allowed. In instances of a credential stuffing attack, the provided credentials may not match any combination within the current site's credential set 234, and the authentication engine 210 can pass the credentials to a credential analysis engine 212 for further review and consideration.

The credential analysis engine 212 can perform operations associated with one or more credentials associated with a failed login attempt. In particular, the credential analysis engine 212 can analyze the failed login attempt and corresponding credentials to maintain a failed credentials log 226 across the plurality of websites. Successful attempts can also be analyzed and may also be maintained in a corresponding log, which may be a part of or associated with the failed credentials log 226. In response to a failed login attempt, the credentials associated with the attempt can be provided to the credential analysis engine 212. The engine 212 can review the failed credential log 226 to determine whether the current failed credentials have already been added to the log 226. If not, a new entry can be added to the failed credential log 226 representing the current failed user credentials 230 used in the attempt. Additionally, an attempt count 232 associated with the credentials 230 can be set to "1". Alternatively, if the credentials are already included in the failed credential log 226, then the attempt count 232 can be incremented to show an additional attempt was made.

The credential analysis engine 212 may also, in some instances, determine whether a particular credential set used in an attempt is similar to another credential 230 included in the failed credential logs 226, as well as any successful credentials. In those instances, a similarity engine 214 can be used to perform a similarity analysis on the failed credentials and at least some of the credentials 230 in the failed credential logs 226. The analysis may be performed by any suitable algorithm or method, and can determine a percentage similarity required to be treated as the same as the existing credentials 230. If a similarity is identified, then the existing credential 230 can be identified and the associated attempt count 232 can be incremented. Further, the variation of the failed credential received can be linked to stored user credential 230 it is similar to in order to allow future comparisons to find the value easily. This portion of the solution allows the system to determine when attackers try slight variations to compromised credential sets, such as modifying a last number of a password (e.g., password1 vs. password2). While the credentials may be stored as hash values of the original password, comparison techniques performed by the similarly engine 214 can determine whether a relative match exists. Any suitable hash comparison techniques may be used.

After each addition to the failed credential logs 226, whether as a new user credential 230 or an incremented attempt count 232, one or more threshold rules 250 may be evaluated to determine whether a particular user credential 230 is determined to be likely compromised. The threshold rules 250 may be a set of general rules used to determine whether a particular credential, based on its failed attempts, should be considered potentially compromised. The rules 250 may define a number of attempts with the credentials 230 (e.g., after 5 failed attempts), a proportion or statistical determination of failed attempts vs. successful attempts with credentials, a number of failed attempts at different sites within a period of time, or any other suitable threshold or metric. Machine learning can also be used to automatically identify risks, and can be used in addition to or in lieu of the threshold rules 250. The rules 250 can also be combined and/or evaluated with other information, such as the IP address from where the attempts are coming from, the rate at which attempts are being made, the CAPTCHA success/fail ratio from the IP address of the attempted, as well as other considerations. In some instances, the rules 250 may be associated with a probability algorithm that determines the likelihood, after a current number or types of attempts, that the particular credentials 230 are compromised. In those instances, the rules 250 may define a particular likelihood or probability, such that when the credential's probability exceeds a defined likelihood, the determination is triggered.

In some instances, users and/or specific sites may define user-specific threshold rules 252 and site-specific threshold rules 254, respectively, that can modify the determination. In some instances, those alternative rules can take priority over any general rules, and can increase or decrease the amount of failures or associated threshold required to determine whether a particular set of credentials are compromised. The threshold manager 218 may be used by administrators associated with the centralized authentication risk evaluation system 202 to modify generic settings for determining compromised credentials, and may also be used by individual users and/or website administrators to modify the user-specific 252 and site-specific threshold rules 254. The threshold analyzer 216 of the credential analysis engine 212 may be used to perform the corresponding analysis as to whether a particular user credential 230 is compromised based on the threshold rules 250 or other more specific rules.

In response to determining that a particular user credential 230 is compromised, a set of action rules 256 may be implemented and enforced by the credential analysis engine 212 (e.g., by the threshold analyzer 216). The action rules 256 may be a set of rules and actions to be taken in response to a detected comprised credential. The actions may include, but are not limited to, locking one or more accounts associated with the failed credential set 230, notifying one or more users associated with the credentials (e.g., by linking a user name to one or more other accounts), adding the credential 230 to the compromised credential list 248, trigger a password change on other related accounts for a next login, analyze one or more existing accounts for potentially similar credentials used by the user and force or request the user to change those credentials, and other actions. In some instances, a relative determination of the likelihood that a particular credential is compromised may determine which or what actions are to be taken. The credential analysis engine 212, can perform the corresponding actions from the action rules 256. If a notification is to occur or a message is to be sent to a particular user account, a notification manager 222 of the authentication manager 208 can perform those operations. The notification manager 222 can, in some instances, identify one or more accounts having a similar user name or identifier as the particular credentials 230, and can identify, for example, user contact information 244 from a related unified user account 242. Additionally, using information about the associated sites 246, attempted logins at those sites can be stopped immediately, and necessary actions performed in order to avoid potential intrusions.

In enacting this solution, even where the compromised credentials 230 represent currently correct credentials for one or more sites, the attempted use of those credentials 230 can be stopped by the authentication manager 208 based on the real time determination. If the authentication manager 208 determines that the credentials are correct, but have been compromised, the authentication manager 208 may be able to trigger a secondary authentication operation. This may include resetting a password associated with the account, requesting security answers to one or more security questions, using geolocation data or IP address information (or other information) to determine whether the location of the login attempt corresponds to known locations of the actual user, or any other additional security methods, before allowing the login and/or requiring a password change for further access.

In some instances, particularly where a new breach has occurred or a new set of credentials is obtained by hackers, a large number of credential stuffing attacks may occur over a large number of accounts and different credential sets. In those instances, when such multiple credential attacks are identified, further analysis may be used to determine an origin of the breach or data. For example, a breach determination module 220 can identify the credentials used in various recent attacks, such as within a particular timeframe, and can attempt to match the credentials (e.g., of multiple different users) to one or more site-specific credential sets 234. If a certain percentage of matches are determined to a particular site, the solution may be able to identify a breach before publicity of the breach is made public. Further, if enough accounts from a specific website are identified as the source of the breach, the current solution may be able to proactively, and before any attempts are made with other credentials from the site, stop or curtail the credential stuffing attack by placing all credentials from that website into the compromised credential list 248. Any future attempts using credentials from that site-specific credential set 234 would be handled in a manner similar to those credentials on the compromised credential list 248, and can also cause other sites associated with the unified user accounts 242 to have their users contacted and notified of the breach, particularly where credentials at those sites match those from the breached website.

As illustrated and described, one or more client devices 290 may be present in the example system 200. Each client 290 may include, be associated with, and/or execute a client application 296 used to attempt to access one or more websites (270, 274, 278) managed by the authentication manager 208. As illustrated, clients 290 may include an interface 292 for communication (similar to or different from interface 204), at least one processor 294 (similar to or different from processor 206), the client application 296, and memory 298 (similar to or different from memory 224). The client device 290 may also include a GUI (not illustrated).

The illustrated client 290 is intended to encompass any computing device such as a desktop computer, laptop/notebook computer, mobile device, smartphone, personal data assistant (PDA), tablet computing device, one or more processors within these devices, or any other suitable processing device. In general, client 290 and its components may be adapted to execute any operating system, including Linux, UNIX, Windows, Mac OS®, Java™, Android™, or iOS. In some instances, client 290 may comprise a computer that includes an input device, such as a keypad, touch screen, camera, or other device(s) that can interact with the client application 296, and output device(s) that convey information associated with the operation of the applications and their application windows to the user of the client 290. Such information may include digital data, visual information, or a GUI as shown with respect to client 290. Specifically, client 290 may be any computing device operable to communicate queries or communications to the plurality of websites 270, 274, 278, the centralized authentication risk evaluation system 202, other clients 290, and/or other components via network 260, as well as with the network 260 itself, using a wireline or wireless connection. In general, client 290 comprises an electronic computer device operable to receive, transmit, process, and store any appropriate data associated with the environment 200 of FIG. 2. In some instances, different client devices 290 may be the same or different types or classes of computing devices. For example, at least one of clients 290 may be associated with a mobile device (e.g., a tablet), while at least one of the clients 290 may be associated with a desktop or laptop computing system. Any combination of device types may be used, where appropriate. Client application 296 may be any suitable application capable of surfing the Internet, interact with one or more online or connected systems or websites, or perform any other actions associated with an application or website requiring a login using secure credentials to gain access.

Different client devices 290 may be associated with actual users and attackers. In some instances, a client device 290 may be used by a user associated with a real account who is attempting to use the website or application in good faith. Other client devices 290 however may be used by attackers or automated attacking systems or software that is attempting to infiltrate accounts and information to which they have no right.

Website A 270, website B 274, and website C 278 may each be connected to the authentication manager 208 via network 260, and may access the authentication operations using one or more application programming interfaces (APIs) or other communication channels to the authentication risk evaluation system 202. When attempted logins are made at a particular site, a corresponding login API 272, 276 or login agent 280 may be used to receive login inputs and transmit those login credentials back to the authentication manager 208 via network 260. In response to the attempts, either access may be granted or denied determined by whether the credentials are valid and whether, if valid, those credentials have not yet been determined to be compromised. The websites 270, 274, 278 may be associated with any system or backend, and can be cloud-based solutions.

While portions of the elements illustrated in FIG. 2 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 3:
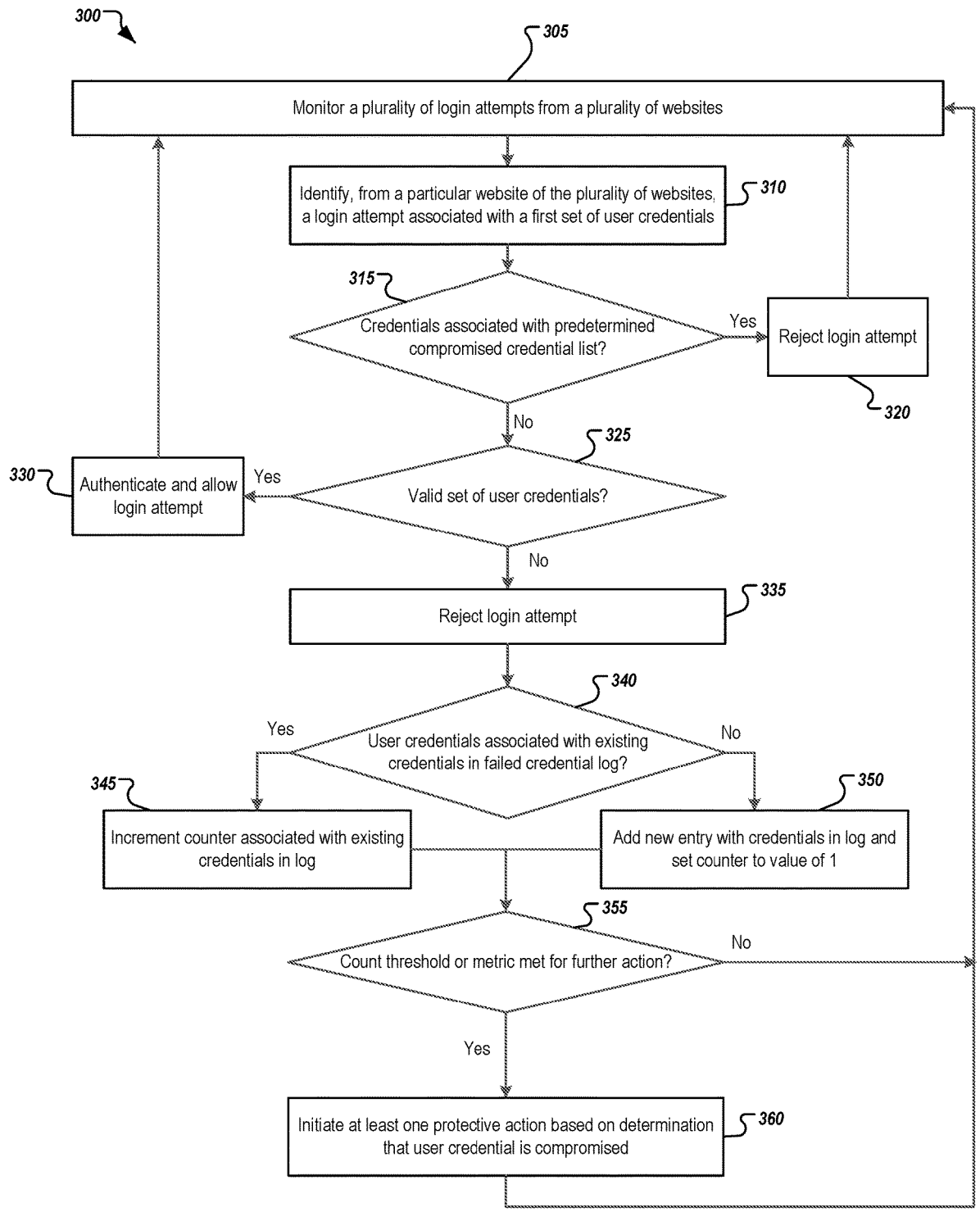
FIG. 3 is a flowchart of an example method for identifying potential attacks through monitoring of user credential login attempts across a network of websites.

FIG. 3 is a flowchart of an example method 300 for identifying potential attacks through monitoring of user credential login attempts across a network of websites. It will be understand that method 300 and related methods may be performed, for example, by any suitable system, environment, software, and hardware, or a combination of systems, environments, software, and hardware, as appropriate. For example, a system comprising a communications module, at least one memory storing instructions and other required data, and at least one hardware processor interoperably coupled to the at least one memory and the communications module can be used to execute method 300. In some implementations, the method 300 and related methods are executed by one or more components of the system 200 described above with respect to FIG. 2.

At 305, a plurality of websites and their respective login attempts can be monitored by a centralized authorization system. The centralized authorization system can perform authentication operations for a plurality of websites and systems, acting as a web service or resource-as-a-service (RaaS) accessible via API calls and/or dedicated connections.

At 310, a login attempt from a particular one of the websites of the plurality of monitored websites can be identified, where the login attempt is associated with a first set of user credentials.

At 315, a determination is made as to whether the credentials are associated with a predetermined list of compromised credentials. The predetermined list of compromised credentials may be a list of credentials known to be compromised, such as based on known prior breaches or based on previous iterations of method 300 where one or more credentials are identified as compromised based on the various analyses and considerations. If the first set of user credentials are determined to be on the list, method 300 continues at 320 where the login attempt is rejected. The method then returns to 305, where monitoring continues for additional login attempts. Alternatively, if the first set of user credentials is not included in the list of compromised credentials, then method 300 continues at 320.

At 325, a determination is made as to whether the first set of user credentials represent a valid set of user credentials for the particular website. In some instances, the first set of user credentials can be compared to a plurality of site-specific user credentials to determine if a match exists. If a match does exist, method 300 continues at 330, where the login attempt is authenticated and the login is allowed. At that point, method 300 returns to 305 and monitoring continues. If, however, no match exists, method 300 rejects the login attempt at 335. From 335, method 300 continues at 340.

At 340, a determination is made as to whether the first set of user credentials are associated with an existing entry of user credentials in a failed credential log maintained by the centralized authorization system. The failed credential log can include a list of user credentials previously determined to fail during login attempts. By adding a count value to each entry, metrics and count thresholds are evaluated to determine whether a particular user credential set may be compromised. In response to determining that an existing entry for the particular user credentials is included in the failed credential log, then the counter or count value associated with that entry is incremented at 345. In response to determining that no existing entry is included in the failed credential log for the particular user credentials, then a new entry associated with the credentials is added in the log at 350, with the counter value set to 1. After either 345 and 350, method 300 continues at 355.

At 355, a determination is made as to whether a count threshold or analysis metric is met, where such a determination causes further action to be performed in association with the first set of user credentials to perform a protective action within the network of systems. In some instances, the count threshold may be a predefined number of failed login attempts associated with the first set of credentials. In some instances, a probability of a compromised credential set may be determined based on login attempt history for the credentials, and compared to a probability amount. Any suitable metric may be used to determine whether the current set of user credentials is to be determined, after the attempt, to be a compromised credential. If it is determined that the count or metric threshold is not met, method 300 returns to 305 for further monitoring. If the first set of credentials is received and fails at another site, then the counter is again incremented and evaluated. However, if it is determined that the count threshold is met, method 300 continues at 360.

At 360, at least one protective action is initiated based on the determination that the first set of user credentials are compromised. The protective action may take many forms, and may be based on any suitable considerations. In some instances, the protective action may include adding the first set of user credentials to the list of compromised credentials to stop any future attempts at any of the plurality of websites. In other instances, the protective action may include notifying a user of the compromised nature of the credentials. For example, the first set of credentials may be linked to particular contact information for a user, or to a unified account linking credentials for a plurality of accounts. Contact information can be identified and used to contact the corresponding user of the potential breach. In some instances, an account associated with the credentials may be locked, including accounts for websites other than the particular website at which the current failed login attempt was used. Once the protective action is taken, method 300 returns to 305, where monitoring is continued.

In some instances, additional information may be considered in addition to the counter alone. For example, the counter can be combined with other considerations to modify or change the count threshold, or to cause additional or alternative determinations to be used. For example, additional data or metadata that can be collected will not necessarily be reflected as a counter—some of those examples include storing IP addresses from which requests are originating along with their frequency and fail rate. Higher than average frequency combined with higher than average fail rate can suggest an ongoing attack from that IP address. In considering the attempts themselves, other relevant metadata that may be collected includes the website where the authentication is being attempted, the time of the attempt, the set of credentials that were used in the attempt, a determination of whether the attempt was successful or not, whether the account exists or does not exist on the target website, the source IP of the request, CAPTCHA information (e.g., was a CAPTCHA presented, if so was it solved correctly, what is the fail rate, etc.), the request headers and the source user-agent along with any associated information that can be obtained about it (e.g., by running JavaScript on the user-agent to collect additional information).

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or performing additional operations, fewer operations, and/or different operations, so long as the methods and systems remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
monitoring, at a centralized authentication system, login attempts associated with a plurality of websites;
identifying a first login attempt at a first website from the plurality of websites, wherein the first login attempt is associated with a first set of user credentials;
in response to determining that the first set of user credentials do not correspond to a valid set of user credentials for the first website:
incrementing a count value associated with an entry in a failed credential log managed by the centralized authentication system, wherein the entry is associated with the first set of user credentials and represents a count of invalid uses of the first credentials across different websites of the plurality of websites;

determining whether a count threshold associated with a compromised user credential rule is exceeded by the current count value associated with the entry in the failed credential log; and in response to determining that the count threshold is exceeded, identifying the first set of credentials as a set of compromised credentials and automatically initiating at least one protective action associated with the first set of credentials.

2. The computer-implemented method of claim 1, wherein the first set of user credentials identifies an account or user name associated with the first website, and wherein determining that the first set of user credentials do not correspond to a valid set of user credentials for the first website comprises determining that the account or user name identified in the first set of user credentials does not exist at the first website.

3. The computer-implemented method of claim 1, further comprising, prior to determining that the first set of user credentials do not correspond to a valid set of user credentials for the first website:

accessing a list of known compromised sets of user credentials;

comparing the first set of user credentials to the list of known comprised sets of user credentials to identify a match; and in response to detecting a match in the list of known comprised sets of user credentials, rejecting the first login attempt.

4. The computer-implemented method of claim 1, wherein incrementing the count value associated with the entry in the failed credential log managed by the centralized authentication system associated with the first set of user credentials comprises:

determining whether an entry associated with the first set of user credentials exists in the failed credential log after determining that the first set of user credentials do not correspond to a valid set of user credentials for the first website; and in response to determining that an entry associated with the first set of user credentials does not exist in the failed credential log, instantiating an entry corresponding to the first set of user credentials in the failed credential log and setting the count value of the entry to one.

5. The computer-implemented method of claim 1, wherein automatically initiating at least one protective action associated with the first set of credentials comprises adding the first set of user credentials to a list of known compromised sets of user credentials.

6. The computer-implemented method of claim 1, wherein automatically initiating at least one protective action associated with the first set of credentials comprises:

identifying a communication channel associated with a user corresponding to the first set of credentials; and transmitting a notification of the compromised user credential to the user via the identified communication channel.

7. The computer-implemented method of claim 1, wherein the count threshold comprises a predetermined number of failed attempts associated with the first set of user credentials.

8. The computer-implemented method of claim 1, wherein the entry reflects a first failed login attempt using the first set of user credentials at the first website and a second failed login attempt using the first set of user credentials at a second website, wherein the second website is different from the first website.

9. A non-transitory, computer-readable medium storing computer-readable instructions executable by a computer and configured to:

monitor, at a centralized authentication system, login attempts associated with a plurality of web sites;

identify a first login attempt at a first website from the plurality of websites, wherein the first login attempt is associated with a first set of user credentials;

in response to determining that the first set of user credentials do not correspond to a valid set of user credentials for the first website:

increment a count value associated with an entry in a failed credential log managed by the centralized authentication system, wherein the entry is associated with the first set of user credentials, represents a count of invalid uses of the first credentials across different websites of the plurality of websites, and reflects a first failed login attempt using the first set of user credentials at the first website and a second failed login attempt using the first set of user credentials at a second website, wherein the second website is different from the first website;

determine whether a count threshold associated with a compromised user credential rule is exceeded by the current count value associated with the entry in the failed credential log; and in response to determining that the count threshold is exceeded, identify the first set of credentials as a set of compromised credentials and automatically initiating at least one protective action associated with the first set of credentials.

10. The computer-readable medium of claim 9, wherein the first set of user credentials identifies an account or user name associated with the first website, and wherein determining that the first set of user credentials do not correspond to a valid set of user credentials for the first website comprises determining that the account or user name identified in the first set of user credentials does not exist at the first website.

11. The computer-readable medium of claim 9, the instructions configured to, prior to determining that the first set of user credentials do not correspond to a valid set of user credentials for the first website:

access a list of known compromised sets of user credentials;

compare the first set of user credentials to the list of known comprised sets of user credentials to identify a match; and in response to detecting a match in the list of known comprised sets of user credentials, reject the first login attempt.

12. The computer-readable medium of claim 9, wherein incrementing the count value associated with the entry in the failed credential log managed by the centralized authentication system associated with the first set of user credentials comprises:

determining whether an entry associated with the first set of user credentials exists in the failed credential log after determining that the first set of user credentials do not correspond to a valid set of user credentials for the first website; and in response to determining that an entry associated with the first set of user credentials does not exist in the failed credential log, instantiating an entry corresponding to the first set of user credentials in the failed credential log and setting the count value of the entry to one.

13. The computer-readable medium of claim 9, wherein automatically initiating at least one protective action associated with the first set of credentials comprises adding the first set of user credentials to a list of known compromised sets of user credentials.

14. The computer-readable medium of claim 9, wherein automatically initiating at least one protective action associated with the first set of credentials comprises:
   identifying a communication channel associated with a user corresponding to the first set of credentials; and
   transmitting a notification of the compromised user credential to the user via the identified communication channel.

15. The computer-readable medium of claim 9, wherein the count threshold comprises a predetermined number of failed attempts associated with the first set of user credentials.

16. A system comprising:
   at least one processor; and
   a non-transitory computer-readable storage medium coupled to the at least one processor and storing programming instructions for execution by the at least one processor, the programming instructions instructing the at least one processor to:
      monitor, at a centralized authentication system, login attempts associated with a plurality of websites;
      identify a first login attempt at a first website from the plurality of websites, wherein the first login attempt is associated with a first set of user credentials;
      in response to determining that the first set of user credentials do not correspond to a valid set of user credentials for the first website:
         increment a count value associated with an entry in a failed credential log managed by the centralized authentication system, wherein the entry is associated with the first set of user credentials and represents a count of invalid uses of the first credentials across different websites of the plurality of websites;
         determine whether a count threshold associated with a compromised user credential rule is exceeded by the current count value associated with the entry in the failed credential log; and
         in response to determining that the count threshold is exceeded, identify the first set of credentials as a set of compromised credentials and automatically initiating at least one protective action associated with the first set of credentials.

17. The system of claim 16, the programming instructions instructing the at least one processor to, prior to determining that the first set of user credentials do not correspond to a valid set of user credentials for the first website:
   access a list of known compromised sets of user credentials;
   compare the first set of user credentials to the list of known comprised sets of user credentials to identify a match; and
   in response to detecting a match in the list of known comprised sets of user credentials, reject the first login attempt.

18. The system of claim 16, wherein incrementing the count value associated with the entry in the failed credential log managed by the centralized authentication system associated with the first set of user credentials comprises:
   determining whether an entry associated with the first set of user credentials exists in the failed credential log after determining that the first set of user credentials do not correspond to a valid set of user credentials for the first website; and
   in response to determining that an entry associated with the first set of user credentials does not exist in the failed credential log, instantiating an entry corresponding to the first set of user credentials in the failed credential log and setting the count value of the entry to one.

* * * * *